United States Patent
Bi et al.

(10) Patent No.: US 10,331,642 B2
(45) Date of Patent: *Jun. 25, 2019

(54) DATA STORAGE METHOD AND APPARATUS

(71) Applicant: HUAWEI TECHNOLOGIES CO., LTD., Shenzhen, Guangdong (CN)

(72) Inventors: Jieshan Bi, Shenzhen (CN); Wei Zhi, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/411,657

(22) Filed: Jan. 20, 2017

(65) Prior Publication Data

US 2017/0132260 A1 May 11, 2017

Related U.S. Application Data

(63) Continuation of application No. 15/054,519, filed on Feb. 26, 2016, now Pat. No. 9,589,004, which is a (Continued)

(51) Int. Cl.
*G06F 16/00* (2019.01)
*G06F 16/22* (2019.01)
(Continued)

(52) U.S. Cl.
CPC ........ *G06F 16/2228* (2019.01); *G06F 16/221* (2019.01); *G06F 16/2455* (2019.01);
(Continued)

(58) Field of Classification Search
CPC ......... G06F 17/30424; G06F 17/30622; G06F 17/30864; G06F 17/3089; G06F 17/30911
(Continued)

(56) References Cited

U.S. PATENT DOCUMENTS 5,295,256 A * 3/1994 Bapat ................ G06F 17/30595
707/999.003
5,878,411 A * 3/1999 Burroughs ........ G06F 17/30607
707/792

(Continued)

FOREIGN PATENT DOCUMENTS

CN 101198953 A 6/2008
CN 102193917 A 9/2011
(Continued)

OTHER PUBLICATIONS

XP055272816. Anonymous: "Datenbanken / Cassandra Datenbanken Online Lexikon", Jun. 26, 2013, with an English translation, total 14 pages.

*Primary Examiner* — Hanh B Thai
(74) *Attorney, Agent, or Firm* — Yeh Kurt Chang

(57) ABSTRACT

A data storage method and apparatus. The method includes: determining a same column attribute of at least two data objects that are to be stored in a KeyValue type distributed database; determining a format of a row identifier of each data object of the at least two data objects, where the row identifier format includes the same column attribute and a data object identifier; determining a row identifier value of each data record of each data object according to the determined row identifier format of each data object; and storing each data record and the row identifier value of each data record, where the row identifier value of each data record is used as a primary index. The data storage method and apparatus in embodiments of the present invention can improve data query efficiency.

18 Claims, 5 Drawing Sheets

Related U.S. Application Data continuation of application No. PCT/CN2013/082544, filed on Aug. 29, 2013.

(51) Int. Cl.
   *G06F 16/28* (2019.01)
   *G06F 16/2455* (2019.01)

(52) U.S. Cl.
   CPC ........ *G06F 16/24562* (2019.01); *G06F 16/28* (2019.01); *G06F 16/289* (2019.01)

(58) Field of Classification Search
   USPC .......................................... 707/736, 737, 744
   See application file for complete search history.

(56) References Cited

U.S. PATENT DOCUMENTS

| | | | | |
|---|---|---|---|---|
| 5,995,973 | A * | 11/1999 | Daudenarde | G06F 17/30607 |
| 6,094,649 | A * | 7/2000 | Bowen | G06F 17/30622 |
| | | | | 707/711 |
| 6,101,502 | A * | 8/2000 | Heubner | G06F 17/30595 |
| 6,112,207 | A * | 8/2000 | Nori | G06F 17/30595 |
| 6,122,639 | A * | 9/2000 | Babu | H04L 12/12 |
| 6,341,289 | B1 * | 1/2002 | Burroughs | G06F 17/30607 |
| | | | | 707/737 |
| 6,360,223 | B1 * | 3/2002 | Ng | G06F 17/30607 |
| 6,374,256 | B1 * | 4/2002 | Ng | G06F 9/4435 |
| | | | | 707/741 |
| 6,385,618 | B1 * | 5/2002 | Ng | G06F 8/30 |
| 6,591,275 | B1 * | 7/2003 | Russell | G06F 17/30595 |
| | | | | 707/960 |
| 6,754,670 | B1 * | 6/2004 | Lindsay | G06F 17/30607 |
| 6,769,124 | B1 * | 7/2004 | Schoening | G06F 9/4435 |
| | | | | 707/999.1 |
| 7,103,588 | B2 | 9/2006 | Beck et al. | |
| 7,490,073 | B1 * | 2/2009 | Qureshi | G06N 5/048 |
| | | | | 706/50 |
| 7,493,313 | B2 * | 2/2009 | Kakivaya | G06F 17/30595 |
| 8,732,213 | B2 * | 5/2014 | Sowell | G06F 17/30911 |
| | | | | 707/809 |
| 2002/0095397 | A1 * | 7/2002 | Koskas | G06F 17/30324 |
| 2002/0095421 | A1 * | 7/2002 | Koskas | G06F 17/30595 |
| 2003/0154197 | A1 * | 8/2003 | Millet | G06F 17/30595 |
| 2006/0047693 | A1 | 3/2006 | Kojima et al. | |
| 2008/0059492 | A1 * | 3/2008 | Tarin | G06F 17/30315 |
| 2008/0140609 | A1 | 6/2008 | Werner et al. | |
| 2011/0225167 | A1 * | 9/2011 | Bhattacharjee | G06F 17/30595 |
| | | | | 707/747 |
| 2013/0232133 | A1 | 9/2013 | Al-Omari et al. | |
| 2014/0074774 | A1 | 3/2014 | Ito et al. | |
| 2014/0317046 | A1 * | 10/2014 | Benke | G06F 17/30563 |
| | | | | 707/602 |
| 2014/0372406 | A1 * | 12/2014 | Hoffman | G06F 17/30289 |
| | | | | 707/714 |

FOREIGN PATENT DOCUMENTS

| | | |
|---|---|---|
| EP | 2003577 A2 | 12/2008 |
| JP | H0567159 A | 3/1993 |
| JP | H736756 A | 2/1995 |
| JP | 2005234612 A | 9/2005 |
| JP | 2006065467 A | 3/2006 |
| JP | 2008269643 A | 11/2008 |
| WO | 2012115194 A1 | 8/2012 |

* cited by examiner

S120

```
┌─────────────────────────────────────────────────────────────┐
│ Specify a first prefix of a row identifier in the KeyValue type │
│ distributed database for the at least two data objects, where the first │ ～S121
│                    prefix is a constant                      │
└─────────────────────────────────────────────────────────────┘
                              │
                              ▼
┌─────────────────────────────────────────────────────────────┐
│ Determine that a row identifier format of a first data object in the at │
│   least two data objects includes the first prefix, the same column    │ ～S122
│      attribute, and a data object identifier of the first data object   │
└─────────────────────────────────────────────────────────────┘
                              │
                              ▼
┌─────────────────────────────────────────────────────────────┐
│ Determine that a row identifier format of a second data object in the at │
│   least two data objects includes the first prefix, the same column     │
│     attribute, a data object identifier of the second data object, and a │ ～S123
│  column attribute that is in column attributes of the second data object │
│       and can distinguish all data records of the second data object    │
└─────────────────────────────────────────────────────────────┘
```

FIG. 2

DATA STORAGE METHOD AND APPARATUS

CROSS-REFERENCE TO RELATED APPLICATIONS

This application is a continuation of U.S. patent application Ser. No. 15/054,519, filed on Feb. 26, 2016, which is a continuation of International Application No. PCT/CN2013/082544, filed on Aug. 29, 2013, both of which are hereby incorporated by reference in their entireties.

TECHNICAL FIELD

The present invention relates to the field of information technologies, and in particular, to a data storage method and apparatus.

BACKGROUND

As a distributed column storage database, a KeyValue type distributed database has high scalability and robustness, and has been widely applied in more and more systems. A user table of the KeyValue type distributed database is generally designed to store data that is in a relatively simple data format, has simple correlation, but may be massive in amount, for example, to store web page address information, to store call record information, or to store network access record information, and the like. The KeyValue type distributed database can provide fast query according to a RowKey of a data record, and the fast query is irrelevant to a data amount. A physical node can be dynamically added for the KeyValue type distributed database when a current storage space usage reaches a threshold.

In existing database applications of enterprises, generally many user data tables are correlated, these data tables have different sizes, and an internal correlation may exist between data of tables. However, the KeyValue type distributed database based on a sparse matrix is suitable to store a table with a large amount of data. If these original tables are directly imported into the KeyValue type distributed database, excessive small tables exist; therefore, it is difficult to implement cross-table correlated query, and management complexity also increases. That is, when data in conventional applications is migrated into the KeyValue type distributed database, to complete correlation query between one user table and another user table, different tables need to be queried, and constant data locating needs to be performed, causing low efficiency.

SUMMARY

Embodiments of the present invention provide a data storage method and apparatus, which can improve data query efficiency.

A first aspect provides a data storage method, including: determining a same column attribute of at least two data objects that are to be stored in a KeyValue type distributed database; determining a format of a row identifier, in the KeyValue type distributed database, of each data object of the at least two data objects, where the row identifier format includes the same column attribute and a data object identifier, and data object identifiers of different data objects in the at least two data objects are at a same location in the row identifier format and located after the same column attribute; determining a row identifier value of each data record of each data object according to the determined row identifier format of each data object; and storing the row identifier value of each data record and each data record in the KeyValue type distributed database, where the row identifier value of each data record is used as a primary index, in the KeyValue type distributed database, of each data record.

In a first possible implementation manner, the method further includes: for row identifier values of all the data records, sorting all the data records in a first order, so that all data records of the at least two data objects form a cluster table.

With reference to the first possible implementation manner of the first aspect, in a second possible implementation manner, the first order is a lexicographic order.

With reference to the first aspect or the first or second possible implementation manner of the first aspect, in a third possible implementation manner, the method further includes: receiving a data request, where the data request instructs to query or acquire a data record in the at least two data objects; constructing, according to the row identifier format, query information for querying the KeyValue type distributed database, where the query information includes the same column attribute; and exporting, according to the query information, a data record whose primary index includes the query information from the KeyValue type distributed database.

With reference to the first aspect or any possible implementation manner in the first to third possible implementation manners of the first aspect, in a fourth possible implementation manner, the determining a format of a row identifier, in the KeyValue type distributed database, of each data object of the at least two data objects includes: specifying a first prefix of the row identifier in the KeyValue type distributed database for the at least two data objects, where the first prefix is a constant; and determining that a row identifier format of a first data object in the at least two data objects includes the first prefix, the same column attribute, and a data object identifier of the first data object; or determining that a row identifier format of a second data object in the at least two data objects includes the first prefix, the same column attribute, a data object identifier of the second data object, and a column attribute that is in column attributes of the second data object and can distinguish all data records of the second data object.

With reference to the fourth possible implementation manner of the first aspect, in a fifth possible implementation manner, the query information includes the first prefix and the same column attribute.

With reference to the fourth or fifth possible implementation manner of the first aspect, in a sixth possible implementation manner, the method further includes: determining that a format of a secondary index, in the KeyValue type distributed database, of any data object in the at least two data objects is a second prefix, a second attribute, and the same column attribute, where the second attribute is a column attribute that is in column attributes of the any data object and is different from the same attribute, and the second prefix is a constant different from the first prefix; determining the secondary index of the any data object according to the format of the secondary index of the any data object; and storing the secondary index of the any data object in the KeyValue type distributed database.

With reference to the first aspect or any possible implementation manner in the first to sixth possible implementation manners of the first aspect, in a seventh possible implementation manner, a separator is set between fields in the row identifier format, or the fields have a fixed length.

A second aspect provides a data storage apparatus, including: a determining module, configured to determine a same column attribute of at least two data objects that are to be stored in a key value type distributed database; determine a format of a row identifier, in the KeyValue type distributed database, of each data object of the at least two data objects, where the row identifier format includes the same column attribute and a data object identifier, and data object identifiers of different data objects in the at least two data objects are at a same location in the row identifier format and located after the same column attribute; and determine a row identifier value of each data record of each data object according to the determined row identifier format of each data object; and a storage module, configured to store the row identifier value of each data record and each data record in the KeyValue type distributed database, where the row identifier value of each data record is used as a primary index, in the KeyValue type distributed database, of each data record.

In a first possible implementation manner, the storage module is further configured to: for row identifier values of all the data records, sort all the data records in a first order, so that all data records of the at least two data objects form a cluster table.

With reference to the first possible implementation manner of the second aspect, in a second possible implementation manner, the first order is a lexicographic order.

With reference to the second aspect or the first or second possible implementation manner of the second aspect, in a third possible implementation manner, the apparatus further includes: a receiving module, configured to receive a data request, where the data request instructs to query or acquire a data record in the at least two data objects; and a query module, configured to construct, according to the row identifier format, query information for querying the KeyValue type distributed database, where the query information includes the same column attribute; and export, according to the query information, a data record whose primary index includes the query information from the KeyValue type distributed database.

With reference to the second aspect or any possible implementation manner in the first to third possible implementation manners of the second aspect, in a fourth possible implementation manner, the determining module is specifically configured to specify a first prefix of the row identifier in the KeyValue type distributed database for the at least two data objects, where the first prefix is a constant; and determine that a row identifier format of a first data object in the at least two data objects includes the first prefix, the same column attribute, and a data object identifier of the first data object; or determine that a row identifier format of a second data object in the at least two data objects includes the first prefix, the same column attribute, a data object identifier of the second data object, and a column attribute that is in column attributes of the second data object and can distinguish all data records of the second data object.

With reference to the fourth possible implementation manner of the second aspect, in a fifth possible implementation manner, the query information includes the first prefix and the same column attribute.

With reference to the fourth or fifth possible implementation manner of the second aspect, in a sixth possible implementation manner, the determining module is further configured to determine that a format of a secondary index, in the KeyValue type distributed database, of any data object in the at least two data objects is a second prefix, a second attribute, and the same column attribute, where the second attribute is a column attribute that is in column attributes of the any data object and is different from the same attribute, and the second prefix is a constant different from the first prefix; and determine the secondary index of the any data object according to the format of the secondary index of the any data object; and the storage module is further configured to store the secondary index of the any data object in the KeyValue type distributed database.

With reference to the second aspect or any possible implementation manner in the first to sixth possible implementation manners of the second aspect, in a seventh possible implementation manner, a separator is set between fields in the row identifier format, or the fields have a fixed length.

Based on the foregoing technical solutions, in the data storage method and apparatus in the embodiments of the present invention, correlated data objects are stored in a KeyValue type distributed database by using a row identifier format including a same column attribute, so that correlated query can be implemented on multiple data objects, thereby improving data query efficiency.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 2 is a schematic flowchart of a method for determining a row identifier format according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to a KeyValue type distributed database.

In the embodiments of the present invention, a data object is a data table (also briefly referred to as a table) or data in a data table format. For example, the data may be call record data, network access record data, or the like. For ease of description, in the following embodiments, description is made by using a data table as an example.

Figure 1:
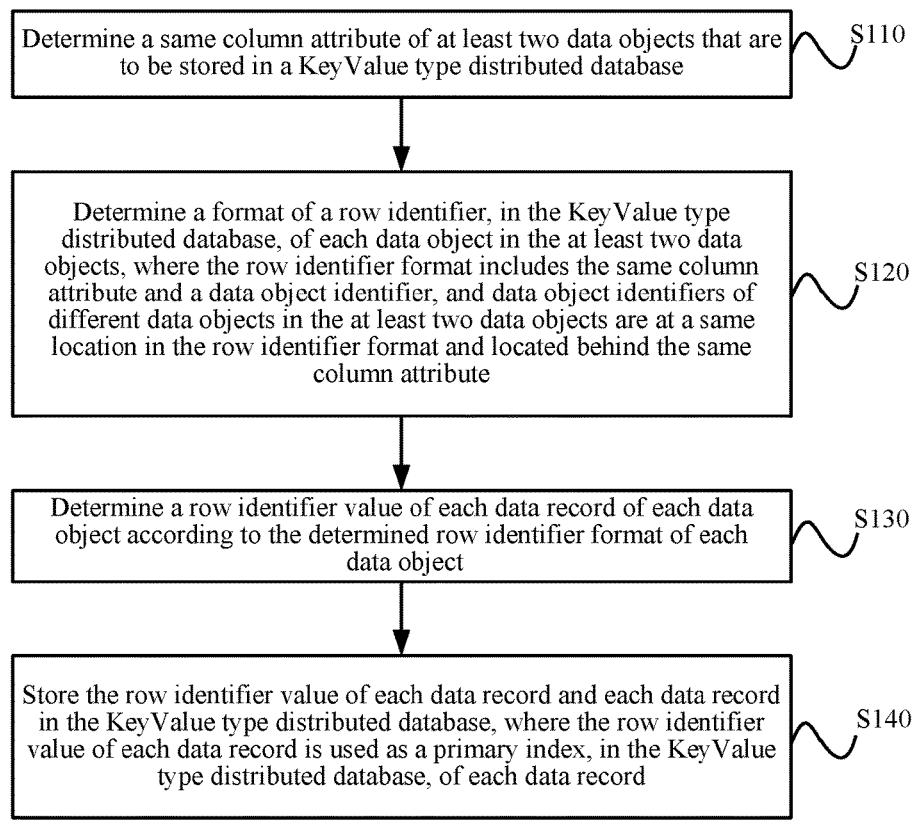
FIG. 1 is a schematic flowchart of a data storage method according to an embodiment of the present invention.

FIG. 1 shows a schematic flowchart of a data storage method 100 according to an embodiment of the present invention. The method in FIG. 1 is executed by a data storage apparatus. As shown in FIG. 1, the method 100 includes:

S110: Determine a same column attribute of at least two data objects that are to be stored in a KeyValue type distributed database.

S120: Determine a format of a row identifier, in the KeyValue type distributed database, of each data object of the at least two data objects, where the row identifier format includes the same column attribute and a data object identifier, and data object identifiers of different data objects in the at least two data objects are at a same location in the row identifier format and located after the same column attribute.

S130: Determine a row identifier value of each data record of each data object according to the determined row identifier format of each data object.

S140: Store the row identifier value of each data record and each data record in the KeyValue type distributed database, where the row identifier value of each data record is used as a primary index, in the KeyValue type distributed database, of each data record.

In this embodiment of the present invention, when multiple (that is, at least two) data objects are correlated, that is, multiple data objects have a same column attribute, to facilitate correlated query on the multiple data objects, the data storage apparatus stores the multiple data objects in one table of the KeyValue type distributed database. The data storage apparatus determines, based on the same column attribute, a format of a row identifier (for example, a RowKey), in the KeyValue type distributed database, of each data object, where the row identifier format includes the same column attribute and a data object identifier, and data object identifiers of different data objects in the at least two data objects are at a same location in the row identifier format and located after the same column attribute. That is, row identifier formats of all the data objects include the same column attribute so as to facilitate query, and further include data object identifiers corresponding to the data objects so as to distinguish different data objects. Data object identifiers of different data objects are at a same location in row identifier formats and located after the same column attribute, so that row identifier formats of the different data objects are of a consistent structure. Then the data storage apparatus determines a row identifier value of each data record in each data object according to the determined row identifier format, and stores the row identifier value of each data record and each data record in the KeyValue type distributed database, where the row identifier value of each data record is used as a primary index, in the KeyValue type distributed database, of each data record. Because consistent row identifier formats are used for the multiple correlated data objects, in this way, during data query, query information is constructed according to the row identifier formats, so that correlated query can be implemented on the multiple data objects in one data table, thereby improving data query efficiency.

Therefore, in the data storage method in this embodiment of the present invention, correlated data objects are stored in a KeyValue type distributed database by using a row identifier format including a same column attribute, so that correlated query can be implemented on multiple data objects, thereby improving data query efficiency.

It should be understood that, in this embodiment of the present invention, a row identifier is an identifier of each row of data. The row identifier may be expressed as a RowKey or a Key, which is not limited in the present invention. For ease of description, in the following embodiments, description is made by using a RowKey as an example.

This embodiment of the present invention is described below in detail by using a specific example. It should be noted that, the example is merely intended to help a person skilled in the art to better understand this embodiment of the present invention, but are not intended to limit the scope of this embodiment of the present invention.

In S110, the data storage apparatus determines a same column attribute of at least two data objects that are to be stored in the KeyValue type distributed database.

That multiple data objects have a same column attribute means that the multiple data objects are correlated.

For example, for a data object A, for which Table 1 recording student information is used as an example, attribute information thereof includes Column attributes such as Name, student number (ID), Sex, and department (Dept).

TABLE 1

| RowKey | Columns | | | | |
|---|---|---|---|---|---|
| ID | Name | ID | Sex | Dept | ... |
| 0001 | Zhang San | 0001 | Male | Class 3 | ... |
| 0002 | Li Si | 0002 | Male | Class 3 | ... |
| 0003 | Wang Wu | 0003 | Female | Class 3 | ... |

For a data object B, for which Table 2 recording student curricula-variable information is used as an example, attribute information thereof includes column attributes such as sequence number (No.), student number (ID), and course.

TABLE 2

| RowKey | Columns | | | |
|---|---|---|---|---|
| ID + No | No | ID | Course | ... |
| 00011 | 1 | 0001 | English | ... |
| 00012 | 2 | 0001 | Chinese | ... |
| 00013 | 3 | 0001 | Math | ... |
| 00024 | 4 | 0002 | English | |
| 00025 | 5 | 0002 | Math | |
| 00036 | 6 | 0003 | English | |

Table 1 and Table 2 both have an ID column, that is, Table 1 and Table 2 have a same column attribute ID; therefore, Table 1 and Table 2 are correlated data objects.

In S120, the data storage apparatus determines a format of a row identifier, in the KeyValue type distributed database, of each data object of the at least two data objects.

The row identifier format includes the same column attribute and a data object identifier, and data object identifiers of different data objects in the at least two data objects are at a same location in the row identifier format and located after the same column attribute.

Specifically, in this embodiment of the present invention, to improve data query efficiency, each data object is not stored in an independent table, but instead, multiple data objects are stored in one table according to a uniform format, thereby implementing correlated query. To store the multiple data objects in one table, a row identifier format needs to be configured in advance, and that a RowKey format is designed in advance is used as an example, that is, a RowKey includes which composition elements and how the composition elements are combined are specified in advance. In this embodiment, the composition elements of the row identifier include: the same column attribute of the at least two data objects and a data object identifier. The same column attribute is used for storing the at least two data objects in a correlated manner, and the data object identifier is used for indicating a data object from which each row of data comes. The data object identifier is located after the same column attribute, and data object identifiers of all the data objects are at a same location in row identifier formats. Specifically, data object identifiers of different data objects may be different constants, to distinguish the different data objects.

In this embodiment of the present invention, optionally, as shown in FIG. 2, S120 includes:

S121: Specify a first prefix of a row identifier in the KeyValue type distributed database for the at least two data objects, where the first prefix is a constant.

S122: Determine that a row identifier format of a first data object in the at least two data objects includes the first prefix, the same column attribute, and a data object identifier of the first data object. Alternatively, S123: Determine that a row identifier format of a second data object in the at least two data objects includes the first prefix, the same column attribute, a data object identifier of the second data object, and a column attribute that is in column attributes of the second data object and can distinguish all data records of the second data object.

Specifically, in this embodiment, a row identifier includes a same prefix (expressed as a first prefix). Using a RowKey as an example, the RowKey is in the following format:

RowKey=first prefix+same column attribute+data object identifier(+another attribute).

In this embodiment, for different data objects, the RowKey format includes the same first prefix and the same attribute. In this way, when data records are stored in an order of RowKey values, data records of different data objects can be adjacently stored (which is referred to as cluster storage). Then the different data objects are distinguished by using a data object identifier of each data object. In addition, when the same column attribute can distinguish all data records of a data object (expressed as a first data object), for example, the ID attribute in Table 1 can distinguish all data records of Table 1, a RowKey format of the first data object does not include another attribute. When the same attribute cannot distinguish all data records of a data object (expressed as a second data object), for example, the ID attribute in Table 2 cannot distinguish all data records of Table 2, a RowKey format of the second data object further needs to include an attribute that is in other column attributes of the second data object and can distinguish all the data records of the second data object, for example, the No attribute in Table 2.

Using Table 1 and Table 2 as examples, their same column attribute is ID. For Table 1, ID can distinguish all data records of Table 1; therefore, a RowKey format of Table 1 may be:

A (first prefix)+ID+M (M is a data object identifier corresponding to Table 1)

For Table 2, ID cannot distinguish all data records of Table 2, and No can distinguish all the data records of Table 2; therefore, a RowKey format of Table 2 may be:

A (first prefix)+ID+N (N is a data object identifier corresponding to Table 2)+No In this embodiment of the present invention, optionally, a separator is set between fields in the row identifier format, or the fields have a fixed length.

That is, "+" in the foregoing RowKey format may be a separator. Alternatively, the fields in the RowKey format may be set to have a fixed length; in this case, "+" actually does not exist.

In S130, the data storage apparatus determines a row identifier value of each data record of each data object according to the determined row identifier format of each data object.

Specifically, using a RowKey as an example, the data storage apparatus determines a RowKey value of each data record in each data object according to the determined RowKey format.

For example, for the first data record in the data object A, a RowKey value is A0001M; and for the first data record in the data object B, a RowKey value is A0001N1, and so on.

In S140, the data storage apparatus stores the row identifier value of each data record and each data record in the KeyValue type distributed database.

The row identifier value of each data record is used as a primary index, in the KeyValue type distributed database, of each data record.

Figure 3:
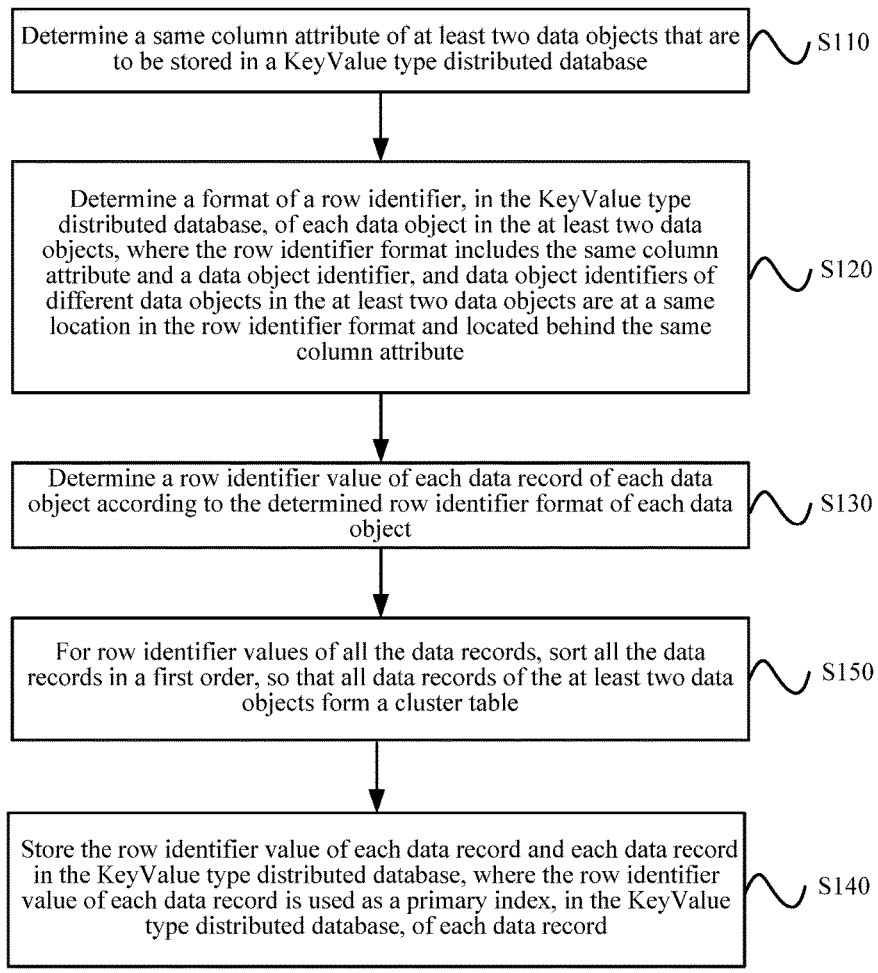
FIG. 3 is a schematic flowchart of a data storage method according to another embodiment of the present invention.

In this embodiment of the present invention, optionally, as shown in FIG. 3, the method 100 further includes:

S150: For row identifier values of all the data records, sort all the data records in a first order, so that all data records of the at least two data objects form a cluster table.

In this embodiment of the present invention, data records are stored in the KeyValue type distributed database in an order of row identifier values, so that data records of multiple data objects form a cluster table. In this cluster-table storage manner, a range of a row identifier value can correspond to a partition, that is, when a row identifier value of a data record belongs to a range, the data record is in a partition corresponding to this range; therefore, query according to a range can be supported.

The first order may be a lexicographic order, for example, all the data records may be sorted in the KeyValue type distributed database in a lexicographic order of RowKey values. The first order may also be another order, for example, a magnitude order, that is, the data records may be sequentially stored in a magnitude order of the RowKey values, where a small RowKey value is stored before a large RowKey value, or a large RowKey value is stored before a small RowKey value. The first order is not limited in this embodiment of the present invention. For ease of description, in the following embodiments, description is made by using a lexicographic order of RowKey values as an example.

Using Table 1 and Table 2 as examples, Table 3 is obtained when storage is performed in the KeyValue type distributed database in a lexicographic order of RowKey values.

TABLE 3

| RowKey RowKey = A + ID + . . . | Columns | | | | | |
|---|---|---|---|---|---|---|
| | Name | ID | Sex | Dept | No | Course |
| A0001M | Zhang San | 0001 | Male | Class 3 | | |
| A0001N1 | | 0001 | | | 1 | English |
| A0001N2 | | 0001 | | | 2 | Chinese |
| A0001N3 | | 0001 | | | 3 | Math |
| A0002M | Li Si | 0002 | Male | Class 3 | | |

TABLE 3-continued

| RowKey RowKey = A + ID + . . . | Columns | | | | | |
|---|---|---|---|---|---|---|
| | Name | ID | Sex | Dept | No | Course |
| A0002N4 | | 0002 | | | 4 | English |
| A0002N5 | | 0002 | | | 5 | Math |
| A0003M | Wang Wu | 0003 | Female | Class 3 | | |
| A0003N6 | | 0003 | | | 6 | English |

(a column including a diagonal indicates that a current row of data does not have the column, which does not occupy any space in storage, and the same goes below)

By using the data storage method in this embodiment of the present invention, data records of different correlated data objects can be adjacently stored, to form a cluster table. For example, the first data record in Table 3 is the first record of the original Table 1, the second to fourth records in Table 3 are the first to third records of the original Table 2, and these data records are adjacently stored in the KeyValue type distributed database because they have the same ID. By means of adjacent storage, a data access rate can be increased, and the query efficiency can be further improved.

The following describes an implementation manner of querying a data table obtained according to the foregoing storage method.

Figure 4:
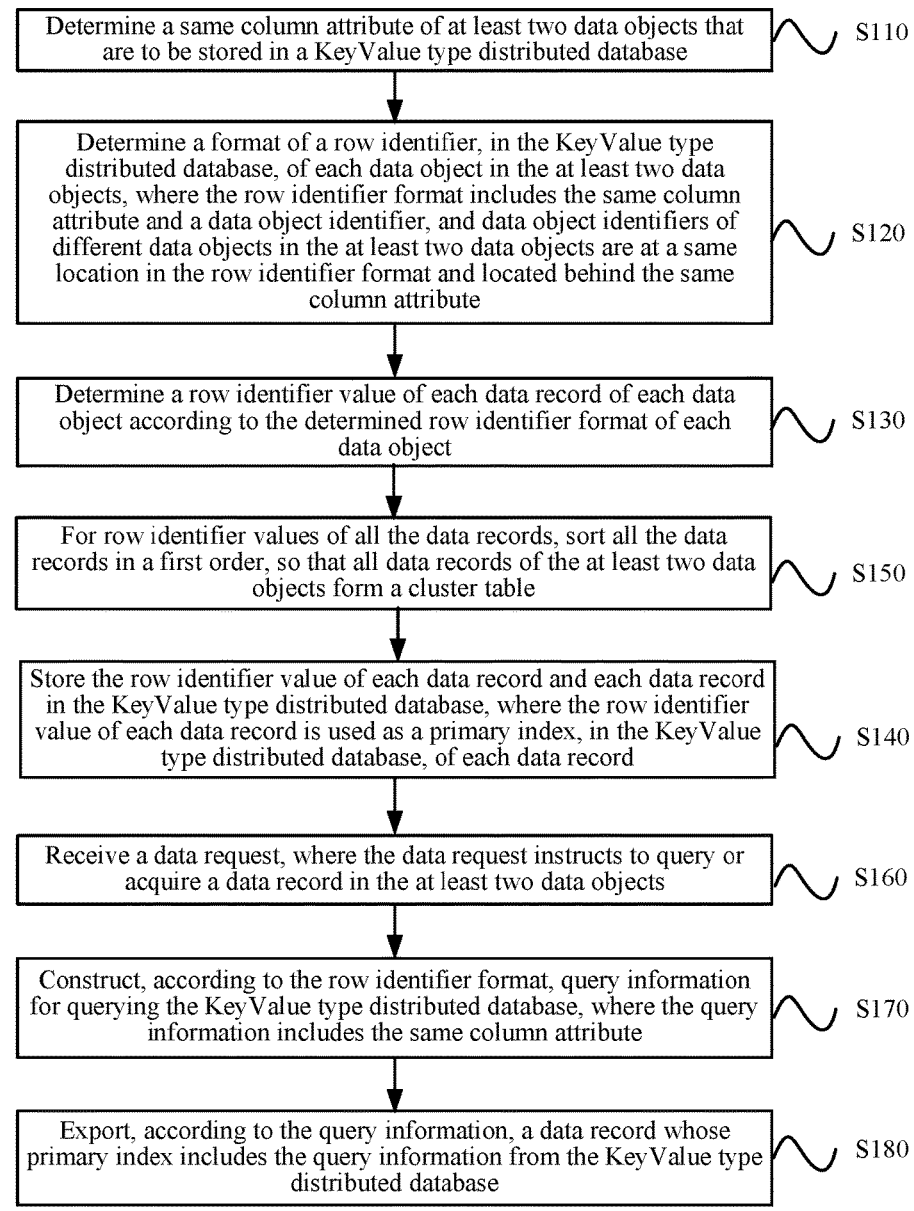
FIG. 4 is a schematic flowchart of a data storage method according to still another embodiment of the present invention.

In this embodiment of the present invention, optionally, as shown in FIG. 4, the method 100 further includes:

S160: Receive a data request, where the data request instructs to query or acquire a data record in the at least two data objects.

S170: Construct, according to the row identifier format, query information for querying the KeyValue type distributed database, where the query information includes the same column attribute.

S180: Export, according to the query information, a data record whose primary index includes the query information from the KeyValue type distributed database.

Specifically, when a data request for querying or acquiring a data record is received, the data storage apparatus constructs query information according to the row identifier format, where the query information needs to include the same column attribute, and then the data storage apparatus performs query by using the constructed query information, to obtain a data record whose primary index includes the query information in the KeyValue type distributed database.

Optionally, when the row identifier format includes the first prefix, the query information includes the first prefix and the same column attribute.

For example, when student information and student curricula-variable information are acquired by using a student number (ID=0001) of a student, query information: A0001 may be constructed, student information and student curricula-variable information of the student with the student number (ID=0001) can be obtained in Table 3 by means of range query. An obtained query result is shown in Table 4. In the query process, only one table needs to be queried, and user data locating needs to be completed only once. As student information and student curricula-variable information are adjacently stored, fast return can be implemented.

TABLE 4

| A0001M | Zhang San | 0001 | Male | Class 3 | | |
|---|---|---|---|---|---|---|
| A0001N1 | | 0001 | | | 1 | English |
| A0001N2 | | 0001 | | | 2 | Chinese |
| A0001N3 | | 0001 | | | 3 | Math |

Therefore, in the data storage method in this embodiment of the present invention, correlated data objects are stored in a KeyValue type distributed database by using a row identifier format including a same column attribute, so that the correlated data objects can be stored as a cluster in one data table, and correlated query can be implemented in one data table, thereby improving data query efficiency.

In this embodiment of the present invention, optionally, the method 100 further includes:

Determine that a format of a secondary index, in the KeyValue type distributed database, of any data object in the at least two data objects is a second prefix, a second attribute, and the same column attribute, where the second attribute is a column attribute that is in column attributes of the any data object and is different from the same attribute, and the second prefix is a constant different from the first prefix.

Determine the secondary index of the any data object according to the format of the secondary index of the any data object.

Store the secondary index of the any data object in the KeyValue type distributed database. Specifically, to satisfy a scenario of complex query, secondary-index information may be constructed for a data object. Data of a primary index and secondary index of a same data object is stored in a same table, but different row identifier formats are used, to implement data separation in the same table. In addition, correlated query may be completed by using the secondary-index information. A row identifier format of a secondary index is a second prefix, a second attribute, and the same attribute. The second prefix is different from the first prefix so as to implement data separation; the second attribute is an attribute different from the same attribute so as to facilitate construction of query information according to the second attribute; and the same attribute is used for correlation with a primary index.

For example, when the data object Table 1 and the data object Table 2 are stored in the KeyValue type distributed database, a primary-index RowKey format of Table 1 may be: A+ID+M; a primary-index RowKey format of Table 2 may be: A+ID+N+No; and a secondary-index RowKey format of Table 1 may be: B+Name+ID. In this way, Table 5 is obtained when storage is performed in the KeyValue type distributed database in a lexicographic order of RowKey values.

TABLE 5

| RowKey RowKey = A + ID + . . . | Columns | | | | | |
|---|---|---|---|---|---|---|
| | Name | ID | Sex | Dept | No | Course |
| A0001M | Zhang San | 0001 | Male | Class 3 | | |
| A0001N1 | | 0001 | | | 1 | English |
| A0001N2 | | 0001 | | | 2 | Chinese |
| A0001N3 | | 0001 | | | 3 | Math |
| A0002M | Li Si | 0002 | Male | Class 3 | | |
| A0002N4 | | 0002 | | | 4 | English |
| A0002N5 | | 0002 | | | 5 | Math |
| A0003M | Wang Wu | 0003 | Female | Class 3 | | |
| A0003N6 | | 0003 | | | 6 | English |
| (the following data belongs to another data partition, and this row is used for indicating separation from the data partition above, and has no actual data) | | | | | | |
| BZhang San0001 | | | | | | |
| BLi Si0002 | | | | | | |
| BWang Wu0003 | | | | | | |

It should be understood that, in columns corresponding to secondary-index RowKeys, column information, such as a particular critical piece of column information, may also be stored, which is not limited in this embodiment of the present invention.

When student information and student curricula-variable information are acquired by using a student name (Name=Zhang San), query information: BZhang San may be constructed, complete secondary-index RowKey information: BZhang San0001 can be obtained in Table 5 by means of range query. The secondary-index RowKey is parsed, to obtain ID=0001. Then query information: A0001 is further constructed, and student information and student curricula-variable information can be obtained in Table 5 by performing further query. This helps a user to perform query when the user knows only a Name but does not know an ID.

Therefore, in the data storage method in this embodiment of the present invention, a secondary index of a data object is stored in a KeyValue type distributed database, so that more diversified query scenarios can be provided to a user, and query by the user can be facilitated, thereby improving data query efficiency.

In this embodiment of the present invention, row identifier formats of multiple data objects may also be implemented in another manner, for example, row identifier formats of different data objects may include different prefixes, or include no prefix.

For example, when no prefix is used, a RowKey is in the following format:

RowKey=same column attribute+data object identifier(+another attribute).

Data records of different data objects can be adjacently stored by using the same column attribute, and the different data objects are distinguished by using a data object identifier corresponding to each data object. In addition, when the same column attribute can distinguish all data records of a data object (expressed as a first data object), a RowKey format of the first data object does not include another attribute; and when the same column attribute cannot distinguish all data records of a data object (expressed as a second data object), a RowKey format of the second data object further needs to include an attribute that is in other column attributes of the second data object and can distinguish all the data records of the second data object.

Using Table 1 and Table 2 as examples, their same column attribute is ID. For Table 1, ID can distinguish all data records of Table 1; therefore, a RowKey format of Table 1 may be:

ID+M

For Table 2, ID cannot distinguish all data records of Table 2, and No can distinguish all the data records of Table 2; therefore, a RowKey format of Table 2 may be:

ID+N+No

In this way, Table 6 is obtained when storage is performed in the KeyValue type distributed database in a lexicographic order of RowKey values.

TABLE 6

| RowKey RowKey = | Columns | | | | | |
|---|---|---|---|---|---|---|
| ID + ... | Name | ID | Sex | Dept | No | Course |
| 0001M | Zhang San | 0001 | Male | Class 3 | | |
| 0001N1 | | 0001 | | | 1 | English |
| 0001N2 | | 0001 | | | 2 | Chinese |
| 0001N3 | | 0001 | | | 3 | Math |
| 0002M | Li Si | 0002 | Male | Class 3 | | |
| 0002N4 | | 0002 | | | 4 | English |

TABLE 6-continued

| RowKey RowKey = | Columns | | | | | |
|---|---|---|---|---|---|---|
| ID + ... | Name | ID | Sex | Dept | No | Course |
| 0002N5 | | 0002 | | | 5 | Math |
| 0003M | Wang Wu | 0003 | Female | Class 3 | | |
| 0003N6 | | 0003 | | | 6 | English |

When student information and student curricula-variable information are acquired by using a student number (ID=0001) of a student, query information: 0001 may be constructed, student information and student curricula-variable information of the student with the student number (ID=0001) can be obtained by means of range query. In the query process, only one table needs to be queried, and user data locating needs to be completed only once. As student information and student curricula-variable information are adjacently stored, fast return can be implemented.

When different prefixes are used for different data objects, a RowKey is in the following format:

RowKey=prefix corresponding to data object+same column attribute(+another attribute).

When different prefixes are used for different data objects, it is implemented that the different data objects are stored in different partitions. In addition, when the same column attribute can distinguish all data records of a data object (expressed as a first data object), a RowKey format of the first data object does not include another attribute; and when the same column attribute cannot distinguish all data records of a data object (expressed as a second data object), a RowKey format of the second data object further needs to include an attribute that is in other column attributes of the second data object and can distinguish all the data records of the second data object.

Using Table 1 and Table 2 as examples, their same column attribute is ID. For Table 1, ID can distinguish all data records of Table 1; therefore, a RowKey format of Table 1 may be:

A+ID

For Table 2, ID cannot distinguish all data records of Table 2, and No can identify all the data records of Table 2; therefore, a RowKey format of Table 2 may be:

B+ID+No

In this way, Table 7 is obtained when storage is performed in the KeyValue type distributed database in a lexicographic order of RowKey values.

TABLE 7

| RowKey RowKey = A (B) + | Columns | | | | | |
|---|---|---|---|---|---|---|
| ID + ... | Name | ID | Sex | Dept | No | Course |
| A0001 | Zhang San | 0001 | Male | Class 3 | | |
| A0002 | Li Si | 0002 | Male | Class 3 | | |
| A0003 | Wang Wu | 0003 | Female | Class 3 | | |
| (the following data belongs to another data partition, and this row is used for indicating separation from the data partition above, and has no actual data) | | | | | | |
| B00011 | | 0001 | | | 1 | English |
| B00012 | | 0001 | | | 2 | Chinese |
| B00013 | | 0001 | | | 3 | Math |
| B00024 | | 0002 | | | 4 | English |
| B00025 | | 0002 | | | 5 | Math |
| B00036 | | 0003 | | | 6 | English |

RowKey formats of different data objects include different prefixes, so that the different data objects can be stored in different partitions in the KeyValue type distributed database.

It should be understood that sequence numbers of the foregoing processes do not mean execution orders in various embodiments of the present invention. The execution orders of the processes should be determined according to functions and internal logic of the processes, and should not be construed as any limitation on the implementation processes of the embodiments of the present invention.

In the data storage method in this embodiment of the present invention, multiple data objects are stored in one data table in a KeyValue type distributed database according to a uniform row identifier format, thereby facilitating management on the database, and improving data query efficiency.

A data storage method according to an embodiment of the present invention is described above in detail, and a data storage apparatus according to an embodiment of the present invention is described below.

Figure 5:
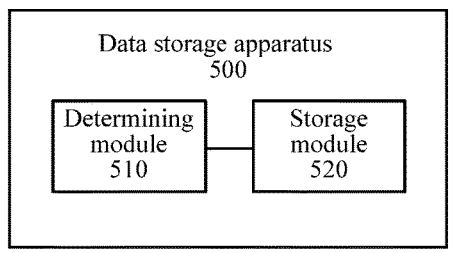
FIG. 5 is a schematic block diagram of a data storage apparatus according to an embodiment of the present invention.

FIG. 5 shows a schematic block diagram of a data storage apparatus 500 according to an embodiment of the present invention. As shown in FIG. 5, the apparatus 500 includes:

a determining module 510, configured to determine a same column attribute of at least two data objects that are to be stored in a key value type distributed database; determine a format of a row identifier, in the KeyValue type distributed database, of each data object of the at least two data objects, where the row identifier format includes the same column attribute and a data object identifier, and data object identifiers of different data objects in the at least two data objects are at a same location in the row identifier format and located after the same column attribute; and determine a row identifier value of each data record of each data object according to the determined row identifier format of each data object; and a storage module 520, configured to store the row identifier value of each data record and each data record in the KeyValue type distributed database, where the row identifier value of each data record is used as a primary index, in the KeyValue type distributed database, of each data record.

When multiple (that is, at least two) data objects are correlated, that is, multiple data objects have a same column attribute, to facilitate correlated query on the multiple data objects, the data storage apparatus 500 stores the multiple data objects in one table of the KeyValue type distributed database. The determining module 510 determines, based on the same column attribute, a format of a row identifier (for example, a RowKey), in the KeyValue type distributed database, of each data object, where the row identifier format includes the same column attribute and a data object identifier, and data object identifiers of different data objects in the at least two data objects are at a same location in the row identifier format and located after the same column attribute. That is, row identifier formats of all the data objects include the same column attribute so as to facilitate query, and further include data object identifiers corresponding to the data objects so as to distinguish different data objects. Data object identifiers of different data objects are at a same location in row identifier formats and located after the same column attribute, so that row identifier formats of the different data objects are of a consistent structure. Then the determining module 510 determines a row identifier value of each data record in each data object according to the determined row identifier format. The storage module 520 stores the row identifier value of each data record and each data record in the KeyValue type distributed database, where the row identifier value of each data record is used as a primary index, in the KeyValue type distributed database, of each data record. Because consistent row identifier formats are used for the multiple correlated data objects, in this way, during data query, query information is constructed according to the row identifier formats, so that correlated query can be implemented on the multiple data objects in one data table, thereby improving data query efficiency.

Therefore, in the data storage apparatus in this embodiment of the present invention, correlated data objects are stored in a KeyValue type distributed database by using a row identifier format including a same column attribute, so that correlated query can be implemented on multiple data objects, thereby improving data query efficiency.

In this embodiment of the present invention, optionally, the storage module 520 is further configured to: for row identifier values of all the data records, sort all the data records in a first order, so that all data records of the at least two data objects form a cluster table.

In this embodiment of the present invention, optionally, the first order is a lexicographic order.

In this embodiment of the present invention, optionally, the determining module 510 is specifically configured to specify a first prefix of a row identifier in the KeyValue type distributed database for the at least two data objects, where the first prefix is a constant; and determine that a row identifier format of a first data object in the at least two data objects includes the first prefix, the same column attribute, and a data object identifier of the first data object; or determine that a row identifier format of a second data object in the at least two data objects includes the first prefix, the same column attribute, a data object identifier of the second data object, and a column attribute that is in column attributes of the second data object and can distinguish all data records of the second data object.

Figure 6:
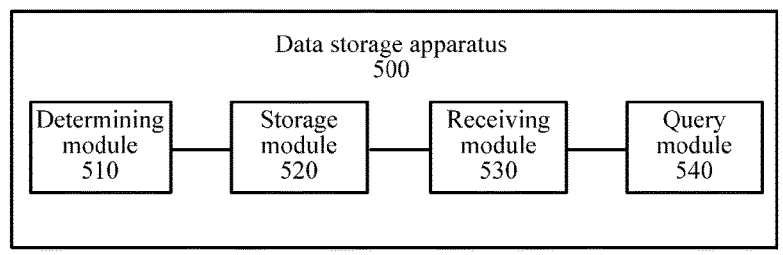
FIG. 6 is a schematic block diagram of a data storage apparatus according to another embodiment of the present invention.

In this embodiment of the present invention, optionally, as shown in FIG. 6, the apparatus 500 further includes:

a receiving module 530, configured to receive a data request, where the data request instructs to query or acquire a data record in the at least two data objects; and a query module 540, configured to construct, according to the row identifier format, query information for querying the KeyValue type distributed database, where the query information includes the same column attribute; and export, according to the query information, a data record whose primary index includes the query information from the KeyValue type distributed database.

Optionally, when the row identifier format includes the first prefix, the query information includes the first prefix and the same column attribute.

In this embodiment of the present invention, optionally, the determining module 510 is further configured to determine that a format of a secondary index, in the KeyValue type distributed database, of any data object in the at least two data objects is a second prefix, a second attribute, and the same column attribute, where the second attribute is a column attribute that is in column attributes of the any data object and is different from the same attribute, and the second prefix is a constant different from the first prefix; and determine the secondary index of the any data object according to the format of the secondary index of the any data object; and the storage module 520 is further configured to store the secondary index of the any data object in the KeyValue type distributed database.

In the data storage apparatus in this embodiment of the present invention, a secondary index of a data object is stored in a KeyValue type distributed database, so that more diversified query scenarios can be provided to a user, and query by the user can be facilitated, thereby improving data query efficiency.

In this embodiment of the present invention, optionally, a separator is set between fields in the row identifier format, or the fields have a fixed length.

The data storage apparatus 500 according to this embodiment of the present invention may correspond to the data storage apparatus in the method according to the foregoing embodiment of the present invention, and the foregoing and other operations and/or functions of the modules of the data storage apparatus 500 are separately performed to implement corresponding procedures of the methods in FIG. 1 to FIG. 4. For brevity, details are not repeated herein.

In the data storage apparatus in this embodiment of the present invention, multiple data objects are stored in one data table in a KeyValue type distributed database according to a uniform row identifier format, thereby facilitating management on the database, and improving data query efficiency.

Figure 7:
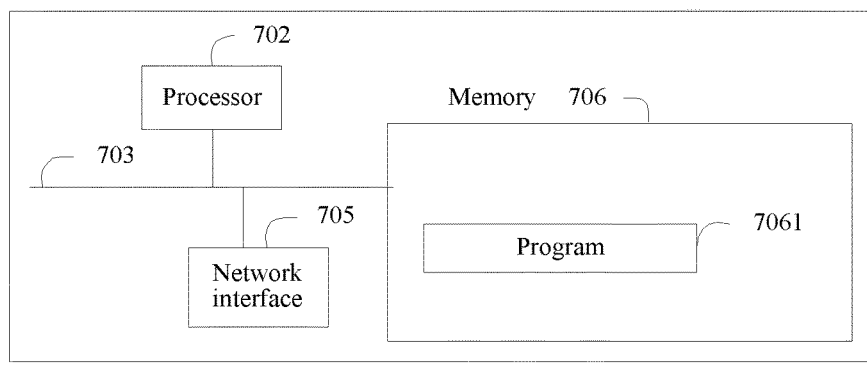
FIG. 7 is a schematic structural diagram of a data storage apparatus according to an embodiment of the present invention.

FIG. 7 shows a structure of a data storage apparatus according to another embodiment of the present invention, including at least one processor 702 (for example, a CPU), at least one network interface 705 or another communications interface, a memory 706, and at least one communications bus 703 configured to implement connection and communication between these apparatuses. The processor 702 is configured to execute an executable module, such as a computer program, stored in the memory 706. The memory 706 may include a high-speed random access memory (RAM), and may further include a non-volatile memory, for example, at least one magnetic disk storage. Communication with and connection to at least another network element are implemented by using the at least one network interface 705 (which may be wired or wireless).

In some implementation manners, the memory 706 stores a program 7061, the program 7061 may be executed by the processor 702, and the program includes:

determining a same column attribute of at least two data objects that are to be stored in a KeyValue type distributed database;

determining a format of a row identifier, in the KeyValue type distributed database, of each data object of the at least two data objects, where the row identifier format includes the same column attribute and a data object identifier, and data object identifiers of different data objects in the at least two data objects are at a same location in the row identifier format and located after the same column attribute;

determining a row identifier value of each data record of each data object according to the determined row identifier format of each data object; and storing the row identifier value of each data record and each data record in the KeyValue type distributed database, where the row identifier value of each data record is used as a primary index, in the KeyValue type distributed database, of each data record.

Optionally, the program further includes:

for row identifier values of all the data records, sorting all the data records in a first order, so that all data records of the at least two data objects form a cluster table.

Optionally, the first order is a lexicographic order.

Optionally, the program further includes:

receiving a data request, where the data request instructs to query or acquire a data record in the at least two data objects;

constructing, according to the row identifier format, query information for querying the KeyValue type distributed database, where the query information includes the same column attribute; and exporting, according to the query information, a data record whose primary index includes the query information from the KeyValue type distributed database.

Optionally, the determining a format of a row identifier, in the KeyValue type distributed database, of each data object of the at least two data objects includes:

specifying a first prefix of a row identifier in the KeyValue type distributed database for the at least two data objects, where the first prefix is a constant; and determining that a row identifier format of a first data object in the at least two data objects includes the first prefix, the same column attribute, and a data object identifier of the first data object; or determining that a row identifier format of a second data object in the at least two data objects includes the first prefix, the same column attribute, a data object identifier of the second data object, and a column attribute that is in column attributes of the second data object and can distinguish all data records of the second data object.

Optionally, the query information includes the first prefix and the same column attribute.

Optionally, the program further includes:

determining that a format of a secondary index, in the KeyValue type distributed database, of any data object in the at least two data objects is a second prefix, a second attribute, and the same column attribute, where the second attribute is a column attribute that is in column attributes of the any data object and is different from the same attribute, and the second prefix is a constant different from the first prefix;

determining the secondary index of the any data object according to the format of the secondary index of the any data object; and storing the secondary index of the any data object in the KeyValue type distributed database.

Optionally, a separator is set between fields in the row identifier format, or the fields have a fixed length.

It can be seen from the foregoing technical solutions provided in the embodiments of the present invention, in the embodiments of the present invention, correlated data objects are stored in a KeyValue type distributed database by using a row identifier format including a same column attribute, so that correlated query can be implemented on multiple data objects, thereby improving data query efficiency.

It should be understood that, the term "and/or" in this embodiment of the present invention describes only a correlation for describing correlated objects and represents that three relationships may exist. For example, A and/or B may represent the following three cases: Only A exists, both A and B exist, and only B exists. In addition, the character "/" in this specification generally indicates an "or" relationship between the correlated objects.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data storage method for a database in a computer system, comprising:
    configuring, by the computer system, an identifier column comprising row identifiers for data records of two data objects, each row identifier identifying one of the data records, wherein the two data objects have a same column attribute, the identifier column associated with a format to represent the row identifiers, the format specified by a first field followed by a second field, the first filed for storing a value corresponding to the same column attribute, and the second filed for storing a data object identifier identifying one of the two data objects;
    storing, by the computer system, the data records of the two data objects in a data table of the database, wherein the data table includes the identifier column, wherein a row of the data table includes a row identifier of the identifier column, the row identifier identifying one of the data records, each column attribute of the two data objects corresponds to one column attribute of the data table, wherein the row identifiers are used for a primary index of each data record in the data table;
    constructing, by the computer system according to the format of the identifier column, query information for querying the data table in response to a data request, wherein the query information comprises the same column attribute; and
    exporting, by the computer system, a data record whose primary index comprises the same column attribute.

2. The method according to claim 1, wherein the data records of the two data objects are stored in an order of values of the row identifiers of the data records, so as to the data table being a cluster table.

3. The method according to claim 2, wherein the order is a lexicographic order.

4. The method according to claim 1, further comprising:
    receiving the data request for querying a data record of the two data objects.

5. The method according to claim 1, wherein the format of identifier column further includes
    a first prefix, wherein the first prefix is located before the same column attribute, and the first prefix is a constant.

6. The method according to claim 5, wherein the data table further comprising additional rows for recording a secondary index of data records of the two data objects, wherein a format of the secondary index specified by a second prefix followed by a second attribute and the same column attribute, wherein the second attribute is a column attribute that is in column attributes of the two data objects and is different from the same column attribute, and the second prefix is a constant different from the first prefix.

7. A non-transitory computer readable storage medium having program instructions embodied therewith, the program instructions executable by a computer to cause the computer to perform the operations of:
    configuring an identifier column comprising row identifiers for data records of two data objects, each row identifier identifying one of the data records, wherein the two data objects have a same column attribute, the identifier column associated with a format to represent the row identifiers, the format specified by a first field followed by a second field, the first filed for storing a value corresponding to the same column attribute, and the second filed for storing a data object identifier identifying one of the two data objects;
    storing the data records of the two data objects in a data table of the database, wherein the data table includes the identifier column, wherein a row of the data table includes a row identifier of the identifier column, the row identifier identifying one of the data records, each column attribute of the two data objects corresponds to one column attribute of the data table, wherein the row identifiers are used for a primary index of each data record in the data table;

constructing, according to the format of the identifier column, query information for querying the data table in response to a data request, wherein the query information comprises the same column attribute; and exporting a data record whose primary index comprises the same column attribute.

8. The computer readable storage medium according to claim 7, wherein the data records of the two data objects are stored in an order of values of the row identifiers of the data records, so as to the data table being a cluster table.

9. The computer readable storage medium according to claim 8, wherein the order is a lexicographic order.

10. The computer readable storage medium according to claim 8, the operations further comprising:
receiving the data request, for querying a data record of the two data objects.

11. The computer readable storage medium according to claim 7, wherein the format of the identifier column further includes a first prefix, and the first prefix is located before the same column attribute, the first prefix is a constant.

12. The computer readable storage medium according to claim 7, wherein the data table further comprising additional rows for recording a secondary index of data records of the two data objects, wherein a format of the secondary index specified by a second prefix followed by a second attribute and the same column attribute, wherein the second attribute is a column attribute that is in column attributes of the two data objects and is different from the same column attribute, and the second prefix is a constant different from the first prefix.

13. A computer system, comprising:
at least one processor;
a database;
a memory having computer instructions stored therein which, when executed by the at least one processor, cause the computer system to perform the operations of:
configuring an identifier column comprising row identifiers for data records of two data objects, each row identifier identifying one of the data records, wherein the two data objects have a same column attribute, the identifier column associated with a format to represent the row identifiers, the format specified by a first field followed by a second field, the first filed for storing a value corresponding to the same column attribute, and the second filed for storing a data object identifier identifying one of the two data objects;

storing the data records of the two data objects in a data table of the database, wherein the data table includes the identifier column, wherein a row of the data table includes a row identifier of the identifier column, the row identifier identifying one of the data records, each column attribute of the two data objects corresponds to one column attribute of the data table, wherein the row identifiers are used for a primary index of each data record in the;

constructing, according to the format of the identifier column, query information for querying the data table in response to a data request, wherein the query information comprises the same column attribute; and exporting a data record whose primary index comprises the same column attribute.

14. The computer system according to claim 13, wherein the data records of the two data objects are stored in an order of values of the row identifiers of the data records, so as to the data table being a cluster table.

15. The computer system according to claim 14, wherein the order is a lexicographic order.

16. The computer system according to claim 13, the operations further comprising:
receiving the data request for querying a data record of the two data objects.

17. The computer system according to claim 13, wherein the format of the identifier column further includes a first prefix, and the first prefix is located before the same column attribute, the first prefix is a constant.

18. The computer system according to claim 13, wherein the data table further comprising additional rows for recording a secondary index of data records of the two data objects, wherein a format of the secondary index specified by a second prefix followed by a second attribute and the same column attribute, wherein the second attribute is a column attribute that is in column attributes of the two data objects and is different from the same column attribute, and the second prefix is a constant different from the first prefix.

* * * * *